United States Patent [19]

Jung

[11] Patent Number: 5,933,482
[45] Date of Patent: Aug. 3, 1999

[54] METHOD AND APPARATUS FOR DESIGNATING AND MAKING AN AUTOMATIC CALL FOR A PAIR OF KEY TELEPHONE SETS IN A KEY TELEPHONE EXCHANGE SYSTEM

[75] Inventor: Tae-Hyun Jung, Kumi, Rep. of Korea

[73] Assignee: SamSung Electronics Co., Ltd., Kyungki-do, Rep. of Korea

[21] Appl. No.: 09/001,000

[22] Filed: Dec. 30, 1997

[30] Foreign Application Priority Data

Dec. 30, 1996 [KR]  Rep. of Korea ..................... 96-76763

[51] Int. Cl.⁶ ..................................... H04M 1/00
[52] U.S. Cl. ............................. 379/159; 379/158
[58] Field of Search ................... 379/156, 157, 379/158, 159, 164, 165

[56] References Cited

U.S. PATENT DOCUMENTS

3,976,847  8/1976  Bidlack et al. .
4,665,545  5/1987  Galensky et al. ........................ 379/157
5,090,052  2/1992  Nakajima et al. ....................... 379/159
5,151,933  9/1992  Abe ......................................... 379/159

*Primary Examiner*—Paul Loomis
*Attorney, Agent, or Firm*—Robert E. Bushnell, Esq.

[57] ABSTRACT

A method for making an automatic call for a designated pair of key telephone sets attendant on a key telephone exchange system. The method includes the steps of designating a specified pair of key telephone sets to be served the automatic call therebetween in an idle state of the pair of the key telephone sets, and storing information of the designated key telephone sets into the key telephone exchange system; and causing either one of the pair of the designated key telephone sets to be connected on the automatic call with the other one of the pair of the designated key telephone sets, responsive to a request for the automatic call by either one of the key telephone sets designated, the key telephone sets being in an idle state.

10 Claims, 5 Drawing Sheets

| KTSj \ KTSi | KTS0 | KTS1 | KTS2 | ... | KTSn-1 | KTSn |
|---|---|---|---|---|---|---|
| KTS0 | $I_{0,0}$ | $I_{0,1}$ | $I_{0,2}$ | ... | $I_{0,n-1}$ | $I_{0,n}$ |
| KTS1 | $I_{1,0}$ | $I_{1,1}$ | $I_{1,2}$ | ... | $I_{1,n-1}$ | $I_{1,n}$ |
| KTS2 | $I_{2,0}$ | $I_{2,1}$ | $I_{2,2}$ | ... | $I_{2,n-1}$ | $I_{2,n}$ |
| KTS3 | $I_{3,0}$ | $I_{3,1}$ | $I_{3,2}$ | ... | $I_{3,n-1}$ | $I_{3,n}$ |
| ... | ... | ... | ... | ... | ... | ... |
| KTSm-1 | $I_{m-1,0}$ | $I_{m-1,1}$ | $I_{m-1,2}$ | ... | $I_{m-1,n-1}$ | $I_{m-1,n}$ |
| KTSm | $I_{m,0}$ | $I_{m,1}$ | $I_{m,2}$ | ... | $I_{m,n-1}$ | $I_{m,n}$ |

METHOD AND APPARATUS FOR DESIGNATING AND MAKING AN AUTOMATIC CALL FOR A PAIR OF KEY TELEPHONE SETS IN A KEY TELEPHONE EXCHANGE SYSTEM

CLAIM OF PRIORITY

This application makes reference to, incorporates the same herein, and claims all benefits accruing under 35 U.S.C §119 from an application entitled Method for Making Automatic Call For Designated Pair Of Key Telephone Sets In Key Telephone Exchange System earlier filed in the Korean Industrial Property Office on Dec. 30, 1996, and there duly assigned Ser. No. 96-76763 by that Office.

BACKGROUND OF THE INVENTION

1. Field of the Invention

The present invention relates to a key telephone exchange system, and in particular, to a method for designating a pair of key telephone sets to make an automatic call therebetween in an idle state of the key telephone sets.

2. Description of the Related Art

In a conventional key telephone exchange system, a user of a key telephone set should dial a telephone number for a specified extension line subscriber every time when making a call to the specified extension line subscriber. Further, when the extension line is engaged by the user for a long time, the other extension line subscribers cannot call the user of the key telephone set. An example of a keytelephone system having an intercome feature is disclosed in U.S. Pat. No. 3,976,847 to Richard Henry Bidlac, et al. entitled Key Telephone System Intercom Arrangement.

In order to solve the above shortcoming of the prior art key telephone exchange system, Korean patent application No. 96-19234, filed by the applicant of this application, see U.S. patent application Ser. No. 08/867,688, discloses a method for making an automatic call. The proposed key telephone exchange system, however, can designate only a single pair of the key telephone sets. That is, since the pair of key telephone sets to be provided with the automatic call service is previously determined, the user of the key telephone needs to ask a telephone technician for help in order to change the extension line subscriber to be provided with the automatic call service.

SUMMARY OF THE INVENTION

It is therefore an object of the present invention to provide a method and apparatus for designating a variable communication pair among key telephone sets available for an automatic call service.

It is another object of the present invention to provide a method and apparatus for freely changing a communication pair among key telephone sets.

To achieve the above and other objects, there is provided a method and apparatus for making an automatic call for a designated pair of key telephone sets attendant on a key telephone exchange system. The method includes the steps of designating a specified pair of key telephone sets to be served the automatic call therebetween in an idle state of the pair of the key telephone sets, and storing information of the designated key telephone sets into the key telephone exchange system; and causing either one of the pair of the designated key telephone sets to be connected on the automatic call with the other one of the pair of the designated key telephone sets, responsive to a request for the automatic call by either one of the key telephone sets designated, the key telephone sets being in an idle state.

The method is accomplished by utilizing a controller for controlling an overall operation of a key telephone exchange system according to a program set up in a read only memory. The read only memory stores an initial program and an operational program for the controller. A random access memory stores extension numbers and data generated as a result of the performance of an exchange function. Under the control of the controller, a switching circuit performs a switching operation, an office line circuit connects a plurality of incoming office lines from a public exchange system to the switching circuit, an extension line circuit connects a plurality of extensions line terminals to the switching circuit, and a ring generator generates a ring signal, upon receiving a call request from the office line circuit or the extension line circuit to a specified extension terminal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

In the following description, numeral specific details such as detailed flow charts, are set forth to provide a more thorough understanding of the present invention. It will be apparent, however, to one skilled in the art that the present invention may be practiced without these specific details. The detailed description of known function and constructions unnecessarily obscuring the subject matter of the present invention will be avoided in the present invention.

Now, a preferred embodiment of the present invention will be explained in detail with reference to the accompanying drawings.

Figure 1:
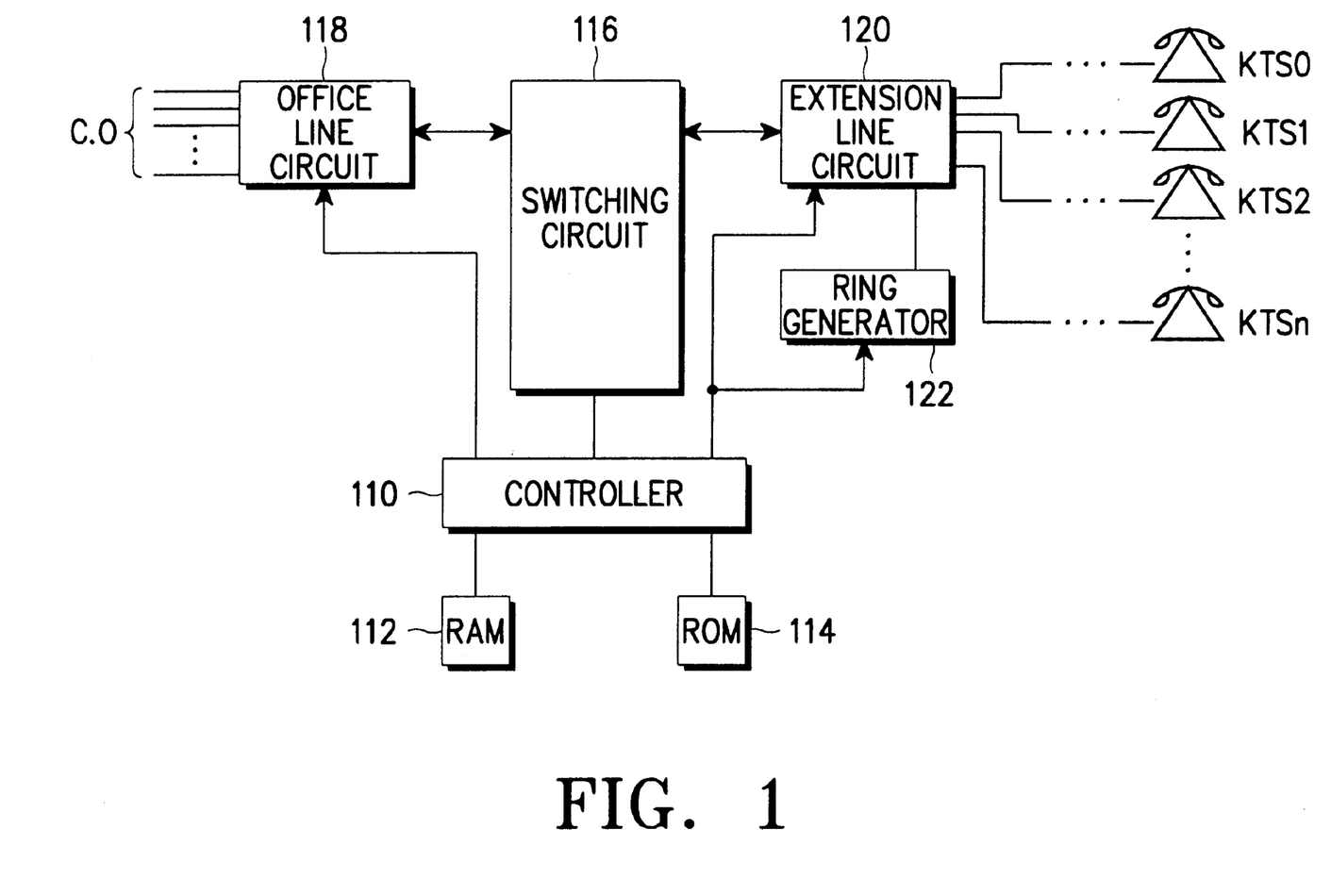
FIG. 1 is a block diagram of a key telephone exchange system to which the present invention is applicable.

Turning to the figures, FIG. 1 is a block diagram illustrating a key telephone exchange system to which the present invention is applicable. As shown in FIG. 1, a controller 110 controls an overall operation of the key telephone exchange system according to a program set up in a read only memory (hereinafter, referred to as ROM) 114. ROM 114 stores an initial program and an operational program for the controller 110. A random access memory (hereinafter, referred to as RAM) 112 stores extension numbers (i.e., telephone numbers for extension line subscribers) and data generated as a result of the performance of an exchange function. Under the control of controller 110, a switching circuit 116 performs a switching operation, an office line circuit 118 connects a plurality of incoming office lines from a public exchange system (not shown) to switching circuit 116, an extension line circuit 120 connects a plurality of extensions line terminals (i.e, key telephone sets) KTS0–KTSn to switching circuit 116, and a ring generator 122 generates a ring signal, upon receiving a call request from office line circuit 118 or extension line circuit 120 to a specified extension terminal.

Figure 2:
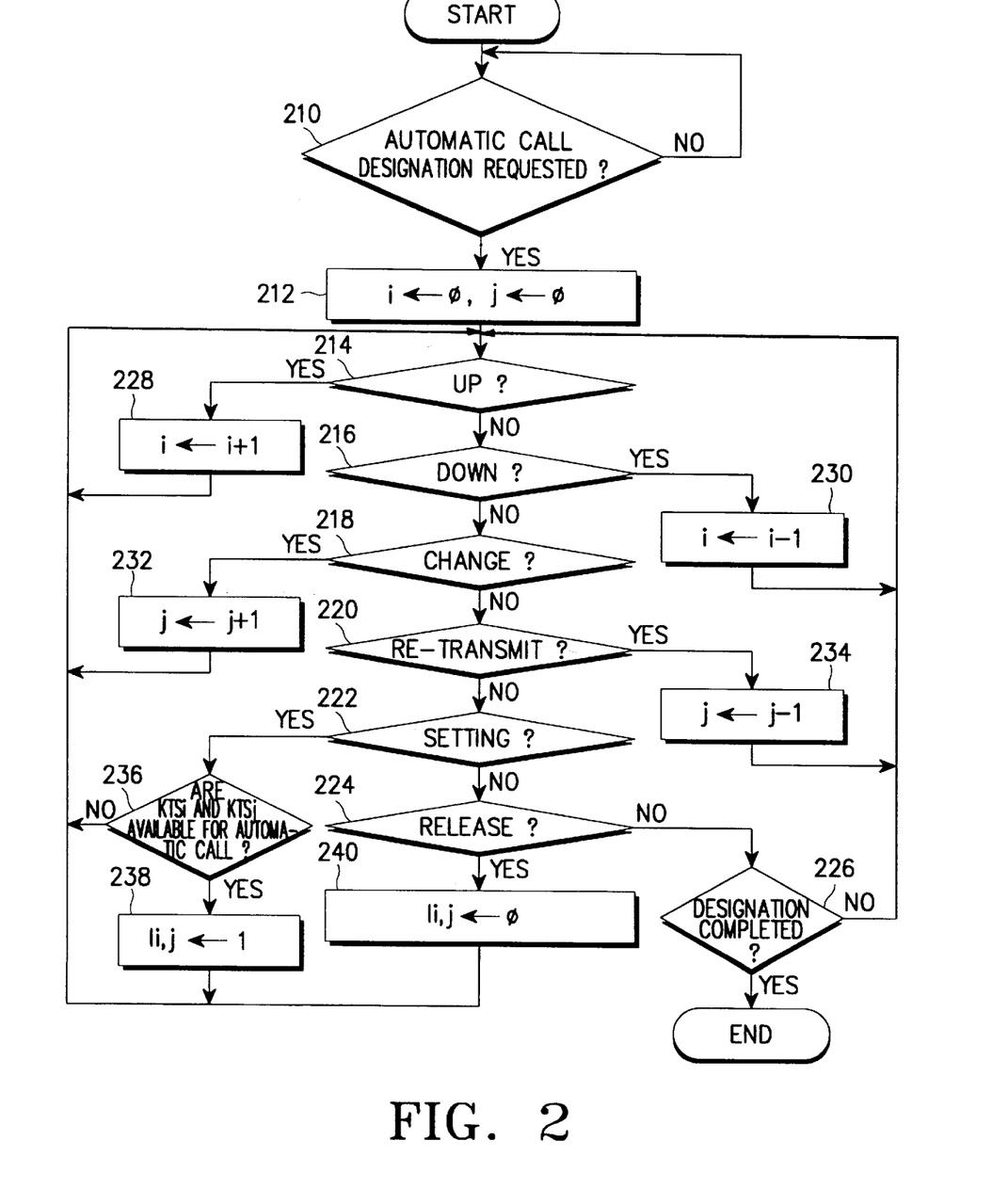
FIG. 2 is a control flow chart for designating an automatic call according to an embodiment of the present invention.

FIG. 2 is a control flow chart for designating which of the key telephone sets can use an automatic call feature according to an embodiment of the present invention, which includes steps of designating pairs of key telephone sets to be provided with an automatic call service; releasing the designated automatic call pair of the key telephone sets; and selecting an automatic call pair to be designated or released.

Figure 3:
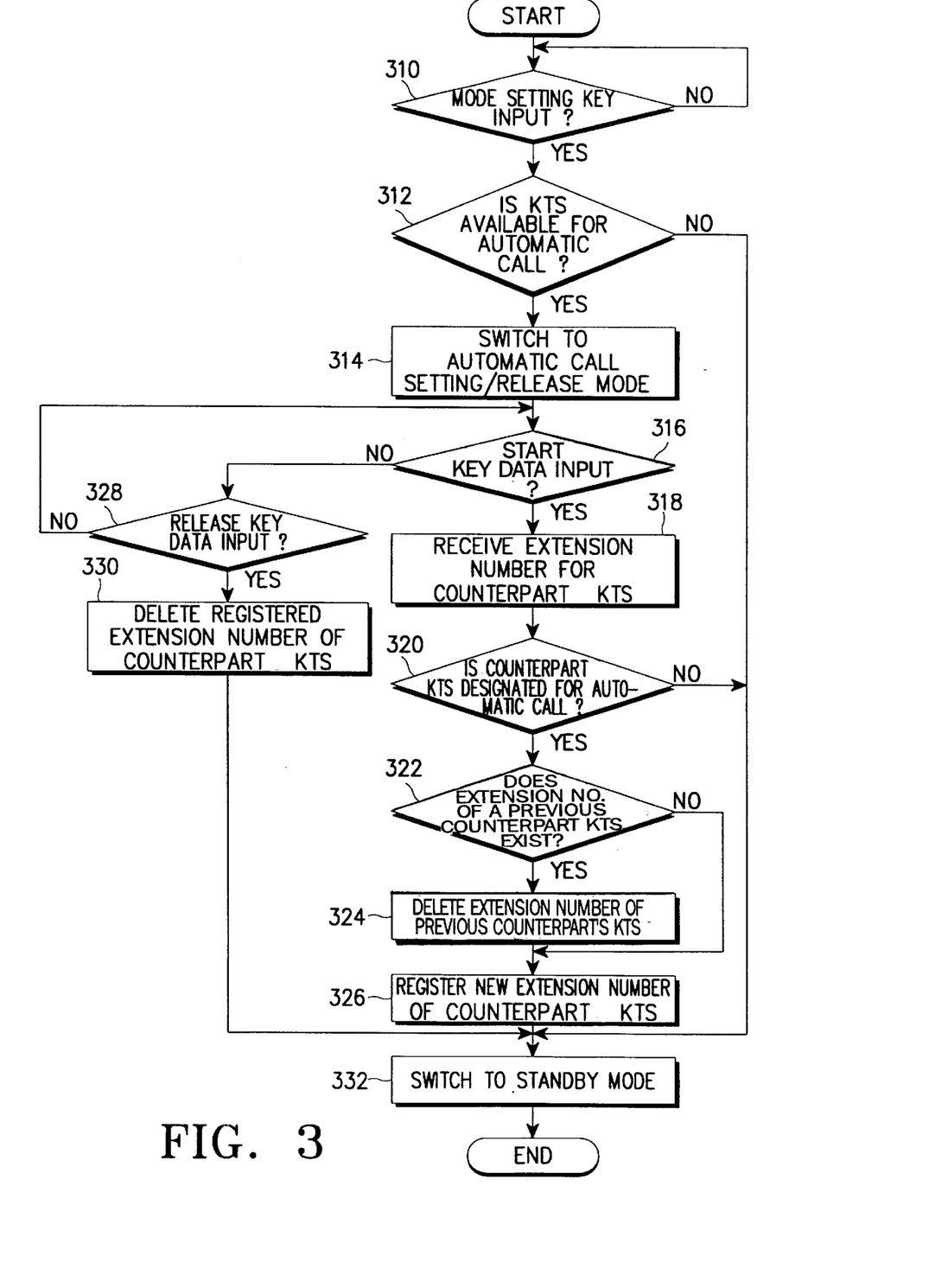
FIG. 3 is a control flow chart for setting and releasing an automatic call according to an embodiment of the present invention.

FIG. 3 is a control flow chart for setting and/or releasing the automatic call according to an embodiment of the present invention, which includes the steps of registering an extension number of a counterpart's key telephone set designated for the automatic call and switching to a standby mode in response to a request for the automatic call; and releasing the automatic call with the counterpart's key telephone set corresponding to the telephone number registered in response to a request for a release of an automatic call from the key telephone sets available for the automatic call.

Figure 4:
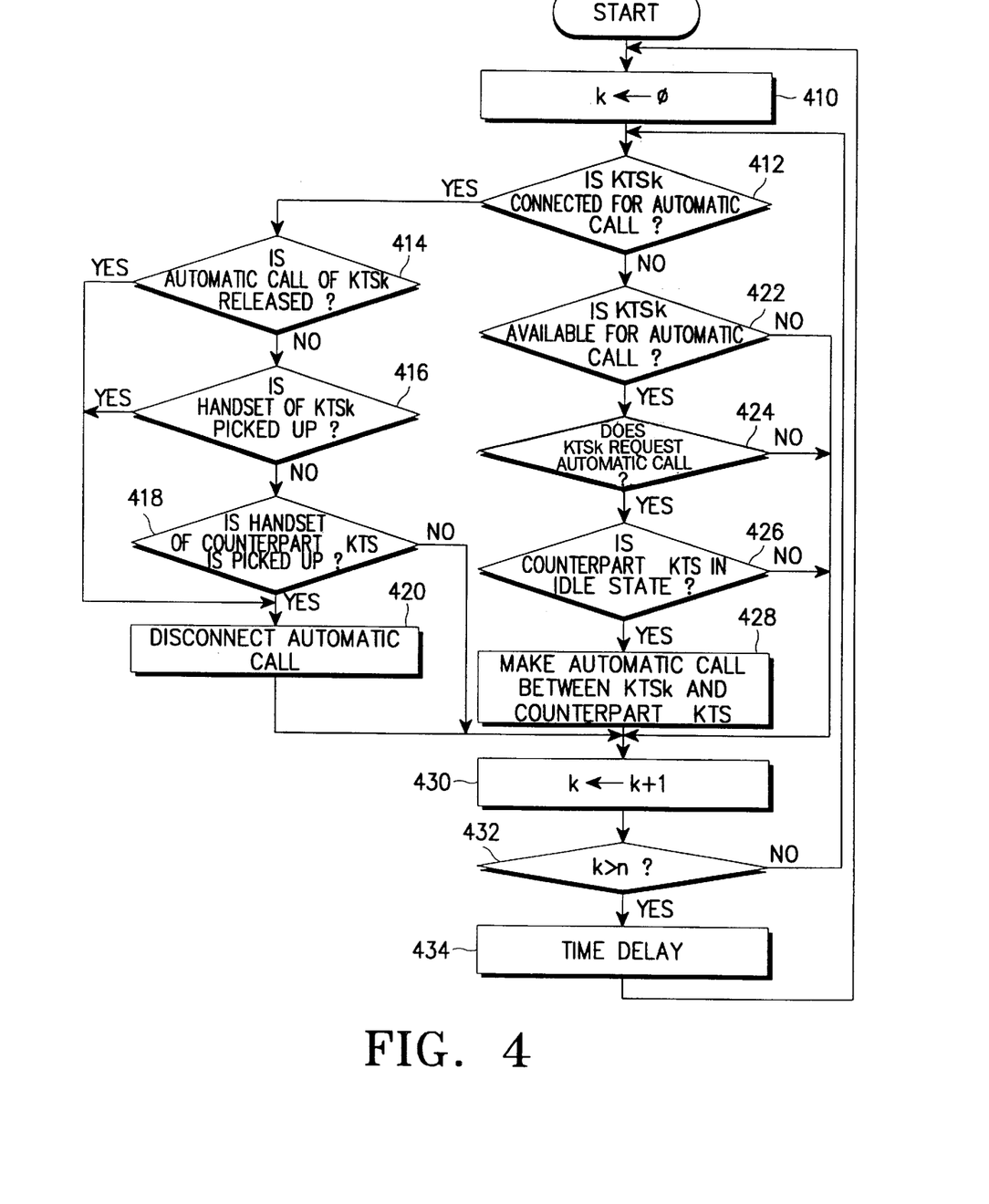
FIG. 4 is a control flow chart for connecting and disconnecting an automatic call according to an embodiment of the present invention.

FIG. 4 is a control flow chart for connecting and disconnecting the automatic call according to an embodiment of the present invention, which includes the steps of checking whether the automatic call between the key telephone sets is released; checking whether a handset of the key telephone set or the counterpart's key telephone set is picked up or whether an incoming ring is detected; disconnecting the automatic call if the automatic call is released, or if a handset of the key telephone set or the counterpart's key telephone set is picked up, or the incoming ring is detected; and connecting the automatic call, if the key telephone set and the counterpart's key telephone are in an idle state. The automatic call connecting and disconnecting modes are sequentially used to a plurality of the key telephone sets. After completion of the above process with respect to all the key telephone sets, the automatic call connecting and disconnecting process is again performed after a lapse of a predetermined time.

Figure 5:
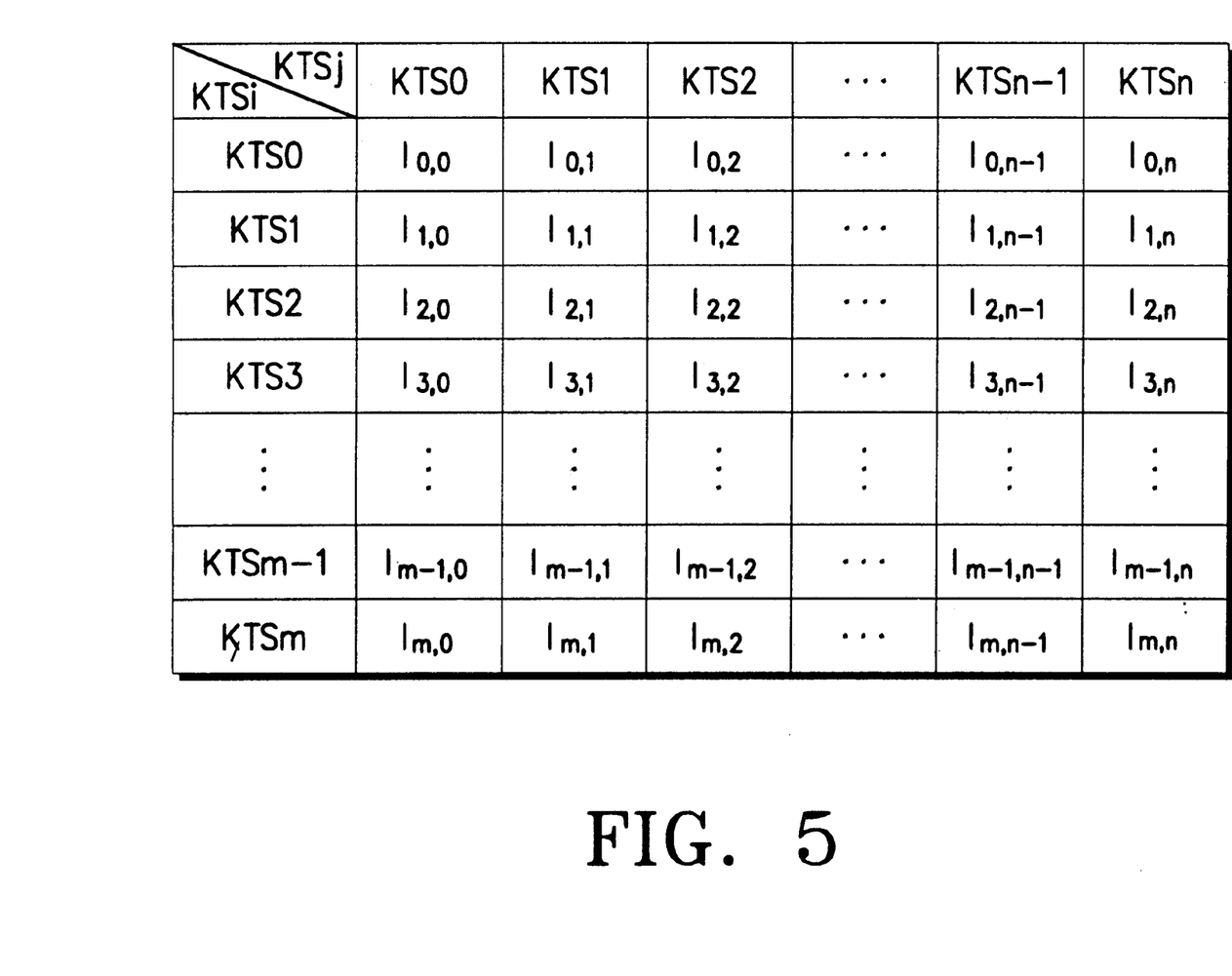
FIG. 5 is a diagram showing a memory map in which designated automatic call pairs are registered according to an embodiment of the present invention.

FIG. 5 is a diagram illustrating a memory map of the RAM 112 according to the present invention, in which data $l_{ij}$ represents an availability of the automatic call between an i-th key telephone set and a j-th key telephone set. If the data $l_{ij}$ is set to "1", it is considered that the automatic call is available between the i-th and j-th key telephone sets. If the data $l_{ij}$ is set to "0", it is considered that the automatic call is not available between the i-th and j-th key telephone sets.

Now, the preferred embodiment of the present invention will be described in detail with reference to the accompanying drawings. It is to be understood that the term "key data" refers either to data generated by a specifically dedicated key or a combination of keys, wherein the keys are either the keys (not shown) provided on one or more of the key telephone sets (as described below) or provided on a keyboard (not shown) connected to the controller.

First, referring to FIG. 2, controller 110 senses at step 210 whether or not request key data for designation of an automatic call pair is received from any one of key telephone sets KTS0–KTSn. If the request key data is received, controller 110 proceeds to step 212 to set counter values "i" and "j" to zero (0). Counter values "i" and "j" are for selecting a connection pair between the i-th and j-th key telephone sets, where the i-th key telephone set is the key telephone set which can initiate an automatic call and the j-th key telephone set is the key telephone set which is available as a counterpart key telephone set to the i-th key telephone set. After setting the counter values i and j, controller 110 searches at steps 214 to 226 for other key data input from the key telephone set making the request in step 210.

At step 214, controller 110 checks whether "up" key data for selecting a next key telephone set to be designated for the automatic call is detected. If Yes, controller 110 proceeds to step 228 to increase the counter value i by one and then returns to step 214 to search a next key data input. However, if the "up" key data is not detected at step 214, it is checked at step 216 whether "down" key data for selecting a previous key telephone set designated for the automatic call is detected. If Yes, controller 110 proceeds to step 230 to decrease the counter value i by one and then returns to step 214 to search a next key data input. However, if the "down" key data is not detected at step 216, it is checked at step 218 whether "change" key data for selecting a counterpart key telephone set to be designated for the automatic call is detected. If Yes, controller 110 proceeds to step 232 to increase the counter value j by one and then, returns to step 214 to search a next key data input. However, if No, it is checked at step 220 whether a "re-transmit" key data for selecting a key telephone set previously designated as a counterpart key telephone for the automatic call is detected. If Yes, controller 110 proceeds to step 234 to decrease the counter value j by one and then, returns to step 214 to search a next key data input.

If "re-transmit" key data is not detected at step 220, it is checked at step 222 whether "setting" key data for requesting the automatic call designation for the key telephone set pair selected through steps 214 to 220 is detected. If Yes, controller 110 proceeds to step 236. Controller 110 checks at step 236 whether the i-th and j-th key telephone sets KTSi and KTSj are all available for the automatic call, i.e., whether the i-th key telephone set can initiate an automatic call and whether the j-th key telephone set can act as the counterpart key telephone set. If step 236 results in a No, controller 110 returns to step 214 to search the next key data input. However, if Yes, controller 110 proceeds to step 238 to store a "1" representing designation of the automatic call pair into a memory area $l_{ij}$ of RAM 112 having the memory map as shown in FIG. 5. Thereafter, controller 110 returns to step 214 to search the next key data input.

If the "setting" key data is not detected at step 222, it is checked at step 224 whether "release" key data for requesting release of designation as an automatic call pair the key telephone set pair selected through steps 214 to 224 is detected. If Yes, controller 110 proceeds to step 240 to store a representing release of the designation as an automatic call pair into a corresponding memory area $l_{ij}$ of the RAM 112. Thereafter, controller 110 returns to step 214 to search the next key data input. If the "release" key data is not detected at step 224, it is checked at step 226 whether a "designation end" key data for requesting completion of designation is detected. Note that prior to requesting completion of the designation steps, a step (not shown) for detecting "clear" key data for releasing all the automatic call pairs, by setting all the values in RAM 112 to zero (0), may be provided. If the "designation end" key data is detected in step 226, the process for designating the automatic call pairs according to the present invention is completed.

Referring back to step 236, it should be understood that controller 110 can be programmed such that, when the count values of both i and j are equal, step 236 will result in a No, because a key telephone set cannot be designated as its own counterpart. Additionally, controller 110 can be programmed such that, when one of the key telephone sets KTSi and KTSj is previously designated, step 236 will result in a No. Alternatively, controller 110 can be programmed such that key telephone set KTSj can be set as a counterpart for more than one key telephone set KTSi, but if key telephone set KTSi is previously designated then step 236 will result in a No. Further, controller 110 can be programmed such that key telephone set KTSi can be designated as the initiating key telephone set more than once an thus can have as an available counterpart one or more of key telephone sets KTSj. Accordingly, it should be understood that controller 110 can be programmed such that only certain ones of the key telephone sets can be designated as an i-th key telephone set for initiating an automatic call and only certain ones of the key telephone sets can be designated as a counterpart j-th key telephone set.

Now, after designating which key telephone sets are available as an automatic call pair as described with regard to FIG. 2, the process for setting and/or releasing a counterpart key telephone set will be described with reference to FIG. 3. In FIG. 3, controller 110 checks at step 310 whether mode setting key data for setting and/or releasing a counterpart key telephone set is received from any one of the key telephone sets KTS0–KTSn. If Yes, controller 110 checks at step 312 whether the key telephone set that provided the mode setting key data, i.e., the key telephone set making the request, is among those i-th key telephone sets designated in RAM 112 as being available for initiating an automatic call. If Yes, controller 110 proceeds to step 314 to switch the key telephone exchange system to the automatic call setting/ release mode. Then controller 110 checks at steps 316 and 328 whether automatic call start key data or automatic call release key data is received from the key telephone set making the request. If the key telephone set that provided the mode setting key data is not among those i-th key telephone sets designated in RAM 112 as being available for initiating the automatic call, controller 110 proceeds to step 332 to switch the key telephone exchange system to a standby mode.

In step 316, if automatic call start key data is detected, controller 110 proceeds to step 318 to receive the extension number from the key telephone set making the request for a desired counterpart key telephone set. Upon receiving the extension number, controller 110 proceeds to step 320 to check whether the key telephone set corresponding to the extension number is designated as being available as a counterpart key telephone set for the key telephone set making the request, by searching the data stored in the memory area $l_{ij}$ of the RAM 112. The data "0" stored in the memory area $l_{ij}$ represents a state that the desired counterpart key telephone set has not been designated as available, and the data "1" represents a state that the desired counterpart key telephone set has been designated as available. If the counterpart key telephone set is not available for the automatic call, controller 110 proceeds to step 332 to switch the key telephone exchange system to the standby mode.

If step 320 determines that the counterpart key telephone set is available for the automatic call, controller 110 proceeds to step 322 to check whether an extension number for a previously set counterpart key telephone set exists for the key telephone set making the request. If Yes, controller 110 proceeds to step 324 to delete the extension number of the previously set counterpart key telephone set and then, proceeds to step 326. However, if No, controller 110 directly proceeds from step 322 to step 326 without passing through step 324. At step 326, controller 110 registers the extension number of the counterpart key telephone set received at step 318, and proceeds to step 332 to switch the key telephone exchange system to the standby mode.

Further, if the "release" key data input is detected at step 328, controller 110 proceeds to step 330 to delete the extension number of the counterpart key telephone set registered in the RAM 112 so as to release the automatic call and then, proceeds to step 332 to switch the key telephone exchange system to the standby mode.

Next, referring to FIG. 4, a process for executing the automatic call will be described. Controller 110 sets a counter value k for sequentially selecting the key telephone sets to "0" at step 410. Thereafter, controller 110 checks at step 412 whether a k-th key telephone set KTSk is connected for the automatic call. If Yes, controller 110 checks a state of the key telephone set connected for the automatic call through steps 414 to 418. Specifically, at step 414, it is checked whether the automatic call of the key telephone set KTSk is released, based on the activation of a predetermined key. If No, then at step 416 it is checked whether the handset of key telephone set KTSk is picked up or whether an incoming ring service is provided to key telephone set KTSk. If No, it is checked at step 418 whether the handset of the counterpart key telephone set is picked up or the incoming ring service is provided the counterpart key telephone set. If Yes at any one of steps 414 to 418, controller 110 proceeds to step 420 to disconnect the automatic call between the key telephone sets by means of switching circuit 116. Thereafter, at step 430, controller 110 increases the counter value k by one to select the next key telephone set. Controller 110 then checks at step 432 whether the above service has been completed for all the key telephone sets KTS0–KTSn by determining whether k is greater than n. If No, controller 110 returns to step 412. However, if Yes, controller 110 returns to step 410 to repeat the above procedure after a lapse of a predetermined time (e.g, 50 msec), at step 434.

Meanwhile, if the automatic call is not connected at step 412, controller 110 checks at step 422 whether the k-th key telephone set KTSk is available for the automatic call by checking the designation set in RAM 112. If the key telephone set KTSk is available for the automatic call, controller 110 proceeds to step 424 to check whether the key telephone set KTSk requests activation of the automatic call by checking, for example, activation of a predetermined key, such as an intercome key. If key telephone set KTSk requests an automatic call, controller 110 proceeds to step 426 to check whether the counterpart key telephone set, set according to the steps of FIG. 3, is in an idle state. If the counterpart key telephone set is in the idle state, controller 110 controls the switching circuit 116 to make the automatic call connection, at step 428, and then step 430 is performed. If any of steps 422, 424 and 426 result in a No, the process jumps to step 430. At step 430, controller 10 increases the value of k by one to select a next key telephone set KTSk+1. Controller 110 then checks at step 432 whether the above service has been completed for all the key telephone sets KTS0–KTSn by determining whether k is greater than n. If No, controller 110 returns to step 412. However, if Yes, controller 110 returns to step 410 to repeat the above procedure after a lapse of a predetermined time (e.g, 50 msec), at step 434.

As apparent from the foregoing, when the automatic call is set, a subscriber of the key telephone set can communicate with a subscriber of the counterpart key telephone set by way of the speaker and microphone prepared in the key telephone set, in the idle state, without dialing the telephone number. Further, if the handset of any one of the key telephone sets in a designated pair is picked up or an incoming call is received, the automatic call is disconnected.

Therefore, the user of the key telephone set can freely make an automatic call with any desired extension line subscribers, without an assistance of the telephone technician.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for designating and making an automatic call for a pair of key telephone sets attendant on a key telephone exchange system, comprising the steps of:

designating one or more of said key telephone sets as able to initiate an automatic call to another of said key telephone sets;

designating one or more of said key telephone sets as available to be selected as a counterpart key telephone set to each of said key telephone sets designated as being able to initiate said automatic call;

inputting, from one of said key telephone sets designated as being able to initiate said automatic call, an extension number corresponding one of said key telephone sets designated as available to be selected as said counterpart key telephone sets;

determining whether said key telephone set corresponding to said extension number is one of said key telephones sets designated as available to be selected as a counterpart key telephone set to said key telephone set which input said extension number;

storing said extension number when said determining step obtains an affirmative result;

placing the key telephone exchange system in a standby state following said storing step or when said determining step obtains a negative result;

checking for activation of a predetermined key of one of said key telephone sets designated as being able to initiate said automatic call to determine whether it is desired to make an automatic call connection by sequentially checking each of said key telephone sets of said key telephone exchange system during said standby state;

checking, after determining that said predetermined key of one of said key telephone sets was activated, whether the designated counterpart key telephone set of the key telephone set having the activated predetermined key is in an idle state; and connecting said key telephone set having the activated predetermined key and the designated counterpart key telephone set when it is determined that the designated counterpart key telephone set is in said idle state.

2. The method as set forth in claim 1, said steps of designating one or more of said key telephone sets as able to initiate an automatic call to another of said key telephone sets and designating one or more of said key telephone sets as available to be selected as a counterpart key telephone set to each of said key telephone sets designated as being able to initiate said automatic call comprises a step of:

storing a value "1" in a memory location $I_{ij}$ of a random access memory, wherein $0 \leq i \leq m$ for indicating which of key telephone sets is able to initiate an automatic call and $0 \leq j \leq n$ for indicating which of key telephone sets is available to be selected as a counterpart key telephone set to the i-th key telephone set.

3. The method as set forth in claim 2, said step of storing a value "1" in a memory location $I_{ij}$ of a random access memory comprises the steps of:

checking for a request for automatic call designation from one of said key telephone sets, said request for automatic call designation initiating a process for designating automatic call key telephone set pairs;

setting an i-counter value to zero and setting a j-counter value to zero, when said request for automatic call designation from one of said key telephone sets is detected;

checking for an input of "up" key data from said key telephone set requesting said automatic call designation and increasing said i-counter value by one when said "up" key data is detected;

checking, when said "up" key data is not detected, for an input of "down" key data from said key telephone set requesting said automatic call designation and decreasing said i-counter value by one when said "down" key data is detected;

checking, when said "down" key data is not detected, for an input of "change" key data from said key telephone set requesting said automatic call designation and increasing said j-counter value by one when said "change" key data is detected;

checking, when said "change" key data is not detected, for an input of "re-transmit" key data from said key telephone set requesting said automatic call designation and decreasing said j-counter value by one when said "re-transmit" key data is detected;

checking, when said "re-transmit" key data is not detected, for an input of "setting" key data from said key telephone set requesting said automatic call designation and checking whether the i-th key telephone set and the j-th key telephone set are available for automatic call designation when said "setting" key data is detected;

storing said value "1" in said memory location $I_{ij}$ of said random access memory when it is determined that said I-th and j-th key telephone sets are available for automatic call designation;

checking, when said "setting" key data is not detected, for an input of "release" key data from said key telephone set requesting said automatic call designation and storing a value "0" in said memory location $I_j$ of said random access memory when said "release" key data is detected;

determining whether said process for designating automatic call key telephone set pairs is completed when said "release" key data is not detected ending the process of designating automatic call key telephone set pairs upon an affirmative determination; and returning to said step of checking for an input of "up" key data after determining said process for designating automatic call key telephone set pairs is not completed, after each of said storing steps, after it is determined that said I-th and j-th key telephone sets are not available for automatic call designation, or after each of the steps of incrementing or decrementing said i-counter or j-counter.

4. The method as set forth in claim 2, said steps of inputting an extension number, determining whether said key telephone set corresponding to said extension number is one of said key telephones sets designated as available to be selected as a counterpart key telephone set and storing said extension number, comprises the steps of:

- checking for input of "mode setting" key data from one of said key telephone sets;
- determining, when said input of "mode setting" key data is detected, whether the key telephone set inputting said "mode setting" key data is available for automatic call by checking said $I_{ij}$ memory locations of said random access memory;
- switching to an automatic call setting and releasing mode when it is determined that said one of said key telephone sets is available for automatic call;
- checking for an input of "start" key data from said one of said key telephone sets and receiving an extension number of another of said key telephone set, from said one of said key telephone sets when said "start" key data is detected;
- checking said $I_{ij}$ memory locations of said random access memory to determine whether said another key telephone set corresponding for the received extension number is available as a counterpart key telephone set for said one of said key telephone sets;
- determining whether an extension number for a previously set counterpart key telephone set already exists and deleting said extension number for said previously set counterpart key telephone set when it is determined that said extension number for said previously set counterpart key telephone set exists;
- registering said received extension number in memory when it is determined that said extension number for said previously set counterpart key telephone set does not exist or after deleting said extension number for said previously set counterpart key telephone set; and
- setting said key telephone exchange system in said standby mode after determining that said one of said key telephone sets is not available for automatic call, after determining that said another key telephone set corresponding for the received extension number is not available as a counterpart key telephone set for said one of said key telephone sets or after said step of registering said received extension number.

5. The method as set forth in claim 4, further comprising the steps of:

- checking for an input of "release" key data from said one of said key telephone sets when said "start" key data is not detected and returning to said step of checking for an input of "start" key data when said "release" key data is not detected;
- deleting from said memory said registered extension number corresponding to said counterpart key telephone set for said one of said key telephone sets when said "release" key is detected; and
- setting said key telephone exchange system in said standby mode after performing said step of deleting from said memory said registered extension number.

6. A key telephone exchange system for designating and making an automatic call for a pair of key telephone sets, comprising:

- a controller for controlling an overall operation of said key telephone exchange system according to a program set up in a read only memory;
- said read only memory for storing an initial program and an operational program for said controller;
- a random access memory for storing extension numbers and data generated as a result of designating ones of said key telephone sets as automatic call pairs;
- a switching circuit for performing a switching operation under the control of said controller;
- an office line circuit for connecting a plurality of incoming office lines from a public exchange system to said switching circuit under the control of said controller;
- an extension line circuit for connecting a plurality of extensions line terminals to said switching circuit under the control of said controller; and
- a ring generator for generating a ring signal, upon receiving a call request from said office line circuit or said extension line circuit to a specified extension terminal, wherein said controller operates to:
  - designate one or more of said key telephone sets as able to initiate an automatic call to another of said key telephone sets;
  - designate one or more of said key telephone sets as available to be selected as a counterpart key telephone set to each of said key telephone sets designated as being able to initiate said automatic call;
  - inputs, from one of said key telephone sets designated as being able to initiate said automatic call, an extension number corresponding one of said key telephone sets designated as available to be selected as said counterpart key telephone sets;
  - determines whether said key telephone set corresponding to said extension number is one of said key telephones sets designated as available to be selected as a counterpart key telephone set to said key telephone set which input said extension number;
  - registers said extension number in said random access memory upon determining that said key telephone set corresponding to said extension number is one of said key telephones sets designated as available to be selected as a counterpart key telephone set to said key telephone set which input said extension number;
  - places the key telephone exchange system in a standby state following after registering said extension number or upon determining that said key telephone set corresponding to said extension number is one of said key telephones sets designated as available to be selected as a counterpart key telephone set to said key telephone set which input said extension number;
  - checks for activation of a predetermined key of one of said key telephone sets designated as being able to initiate said automatic call to determine whether it is desired to make an automatic call connection by sequentially checking each of said key telephone sets of said key telephone exchange system during said standby state;
  - checks, after determining that said predetermined key of one of said key telephone sets was activated, whether the designated counterpart key telephone set of the key telephone set having the activated predetermined key is in an idle state; and
  - connects said key telephone set having the activated predetermined key and the designated counterpart key telephone set when it is determined that the designated counterpart key telephone set is in said idle state.

7. The key telephone exchange system as set forth in claim 6, said controller:

stores a value "1" in a memory location $I_{ij}$ of said random access memory, wherein $0 \leq i \leq m$ for indicating which of key telephone sets is designated as able to initiate an automatic call and $0 \leq j \leq n$ for indicating which of key telephone sets is designated as available to be selected as a counterpart key telephone set to the i-th key telephone set.

8. The key telephone exchange system as set forth in claim 7, wherein said controller stores said value "1" in said memory location $I_{ij}$ of said random access memory by:

checking for a request for automatic call designation from one of said key telephone sets, said request for automatic call designation initiating a process for designating automatic call key telephone set pairs;

setting an i-counter value to zero and setting a j-counter value to zero, when said request for automatic call designation from one of said key telephone sets is detected;

checking for an input of "up" key data from said key telephone set requesting said automatic call designation and increasing said i-counter value by one when said "up" key data is detected;

checking, when said "up" key data is not detected, for an input of "down" key data from said key telephone set requesting said automatic call designation and decreasing said i-counter value by one when said "down" key data is detected;

checking, when said "down" key data is not detected, for an input of "change" key data from said key telephone set requesting said automatic call designation and increasing said j-counter value by one when said "change" key data is detected;

checking, when said "change" key data is not detected, for an input of "re-transmit" key data from said key telephone set requesting said automatic call designation and decreasing said j-counter value by one when said "re-transmit" key data is detected;

checking, when said "re-transmit" key data is not detected, for an input of "setting" key data from said key telephone set requesting said automatic call designation and checking whether the i-th key telephone set and the j-th key telephone set are available for automatic call designation when said "setting" key data is detected;

storing said value "1" in said memory location $I_{ij}$ of said random access memory when it is determined that said I-th and j-th key telephone sets are available for automatic call designation;

checking, when said "setting" key data is not detected, for an input of "release" key data from said key telephone set requesting said automatic call designation and storing a value "0" in said memory location $I_{ij}$ of said random access memory when said "release" key data is detected;

determining whether said process for designating automatic call key telephone set pairs is completed when said "release" key data is not detected ending the process of designating automatic call key telephone set pairs upon an affirmative determination; and again checking for an input of "up" key data after determining said process for designating automatic call key telephone set pairs is not completed, after storing the values "1" or "0", after it is determined that said I-th and j-th key telephone sets are not available for automatic call designation, or after incrementing or decrementing said i-counter or j-counter.

9. The key telephone exchange system as set forth in claim 7, wherein said controller inputs said extension number, determines whether said key telephone set corresponding to said extension number is one of said key telephones sets designated as available to be selected as a counterpart key telephone set and registers said extension number by:

checking for input of "mode setting" key data from one of said key telephone sets;

determining, when said input of "mode setting" key data is detected, whether the key telephone set inputting said "mode setting" key data is available for automatic call by checking said $I_{ij}$ memory locations of said random access memory;

switching to an automatic call setting and releasing mode when it is determined that said one of said key telephone sets is available for automatic call;

checking for an input of "start" key data from said one of said key telephone sets and receiving an extension number of another of said key telephone set, from said one of said key telephone sets when said "start" key data is detected;

checking said $I_{ij}$ memory locations of said random access memory to determine whether said another key telephone set corresponding for the received extension number is available as a counterpart key telephone set for said one of said key telephone sets;

determining whether an extension number for a previously set counterpart key telephone set already exists and deleting said extension number for said previously set counterpart key telephone set when it is determined that said extension number for said previously set counterpart key telephone set exists;

registering said received extension number in said random access memory when it is determined that said extension number for said previously set counterpart key telephone set does not exist or after deleting said extension number for said previously set counterpart key telephone set; and setting said key telephone exchange system in said standby mode after determining that said one of said key telephone sets is not available for automatic call, after determining that said another key telephone set corresponding for the received extension number is not available as a counterpart key telephone set for said one of said key telephone sets or after registering said received extension number.

10. The key telephone exchange system as set forth in claim 9, wherein said controller further operates to:

check for an input of "release" key data from said one of said key telephone sets when said "start" key data is not detected and again checks for an input of "start" key data when said "release" key data is not detected;

deletes from said random access memory said registered extension number corresponding to said counterpart key telephone set for said one of said key telephone sets when said "release" key is detected; and sets said key telephone exchange system in said standby mode after deleting from said random access memory said registered extension number.

* * * * *